(12) United States Patent
Pak et al.

(10) Patent No.: US 8,842,242 B2
(45) Date of Patent: Sep. 23, 2014

(54) LIQUID CRYSTAL DISPLAY, ESTIMATING METHOD OF AMBIENT LIGHT AND DRIVING METHOD OF LIQUID CRYSTAL DISPLAY

(75) Inventors: Sang-Jin Pak, Yongin-si (KR);
Seung-Gyu Tae, Osan-si (KR);
Joo-Hyung Lee, Seoul (KR);
Soon-Dong Kim, Pyeungtaek-si (KR)

(73) Assignee: Samsung Display Co., Ltd., Yongin, Gyeonggi-Do (KR)

( * ) Notice: Subject to any disclaimer, the term of this patent is extended or adjusted under 35 U.S.C. 154(b) by 539 days.

(21) Appl. No.: 12/616,483

(22) Filed: Nov. 11, 2009

(65) Prior Publication Data
US 2010/0117943 A1  May 13, 2010

(30) Foreign Application Priority Data
Nov. 13, 2008  (KR) .......................... 10-2008-0112824

(51) Int. Cl.
*G02F 1/1333* (2006.01)
*G02F 1/133* (2006.01)
*G09G 3/36* (2006.01)
*G02F 1/1335* (2006.01)
*G09G 3/34* (2006.01)

(52) U.S. Cl.
CPC ........ *G02F 1/133512* (2013.01); *G09G 3/3648* (2013.01); *G09G 2320/0633* (2013.01); *G09G 2310/06* (2013.01); *G02F 2001/133388* (2013.01); *G09G 2360/144* (2013.01); *G02F 2201/58* (2013.01); *G09G 3/342* (2013.01)
USPC .......................................... 349/116; 349/110

(58) Field of Classification Search
USPC ..................................... 349/12, 116
See application file for complete search history.

(56) References Cited

U.S. PATENT DOCUMENTS

| | | | |
|---|---|---|---|
| 7,586,479 B2 * | 9/2009 | Park et al. | 345/102 |
| 2004/0113877 A1* | 6/2004 | Abileah et al. | 345/92 |
| 2005/0146651 A1* | 7/2005 | Whitted et al. | 349/58 |
| 2007/0146296 A1* | 6/2007 | Kang et al. | 345/102 |
| 2008/0246905 A1* | 10/2008 | Chen et al. | 349/106 |
| 2009/0309858 A1* | 12/2009 | Jin et al. | 345/207 |
| 2010/0253614 A1* | 10/2010 | Chen | 345/102 |

OTHER PUBLICATIONS

Chinese Office Action Dated Jun. 27, 2013.

* cited by examiner

*Primary Examiner* — Jessica M Merlin
(74) *Attorney, Agent, or Firm* — F. Chau & Associates, LLC

(57) ABSTRACT

Provided are a liquid crystal display, a method of estimating ambient light, and a driving method of the liquid crystal display. The liquid crystal display includes a first electrode and a second electrode generating an electric field, liquid crystal molecules the orientation state of which is changed by the generated electric field, and a photodetector sensing the light passing through the liquid crystal molecules.

15 Claims, 11 Drawing Sheets

LIQUID CRYSTAL DISPLAY, ESTIMATING METHOD OF AMBIENT LIGHT AND DRIVING METHOD OF LIQUID CRYSTAL DISPLAY

CROSS-REFERENCE TO RELATED APPLICATION

This application claims priority from Korean Patent Application No. 10-2008-0112824 filed on Nov. 13, 2008 in the Korean Intellectual Property Office, the disclosure of which is incorporated herein by reference in its entirety.

BACKGROUND OF THE INVENTION

1. Technical Field

The present invention relates to a liquid crystal display, and more particularly, to a liquid crystal display, an estimating method of ambient light, and a driving method of the liquid crystal display.

2. Discussion of the Related Art

A liquid crystal display generally includes a liquid crystal panel composed of a first display panel provided with pixel electrodes, a second display panel provided with a common electrode, and a liquid crystal layer interposed between the first and second display panels. The liquid crystal layer includes liquid crystal molecules having dielectric anisotropy. An electric field is generated between the pixel electrodes and the common electrode. The intensity of the electric field is adjusted, thereby controlling the amount of light transmitted through the liquid crystal panel and displaying a desired image. Since the liquid crystal display cannot emit light by itself, a backlight unit for supplying the liquid crystal panel with light is provided at the rear surface of the liquid crystal panel.

In recent years, in order to reduce power consumption of a backlight unit, technology for adjusting the brightness of a backlight according to the level of ambient light has been developed. To implement such technology, a liquid crystal display requires a light estimator for accurately estimating the brightness of ambient light.

SUMMARY OF THE INVENTION

Exemplary embodiments of the present invention provide a liquid crystal display capable of accurately estimating the brightness of ambient light.

The present invention also provides an ambient light estimating method of accurately estimating the brightness of ambient light.

The present invention also provides a method of driving a liquid crystal display capable of accurately estimating the brightness of ambient light.

The above and other features and aspects of exemplary embodiments of the present invention will be described in the following description with reference to the accompanying drawings.

According to an aspect of the present invention, there is provided a first electrode and a second electrode to generate an electric field, liquid crystal molecules having the orientation state of which is changed by the electric field, and a photodetector sensing the light having passed through the liquid crystal molecules.

According to another aspect of the present invention, there is provided a method of estimating ambient light including sensing first light having passed through liquid crystal molecules in a state in which the liquid crystal molecules are oriented in a first orientation state, sensing second light having passed through liquid crystal molecules in a state in which the liquid crystal molecules are oriented in a second orientation state, and estimating the brightness of ambient light using a difference between the first light and the second light.

According to still another aspect of the present invention, there is provided a method of driving a liquid crystal display including sensing first light having passed through liquid crystal molecules in a state in which the liquid crystal molecules are oriented in a first orientation state, sensing second light having passed through liquid crystal molecules in a state in which the liquid crystal molecules are oriented in a second orientation state, estimating the brightness of ambient light using a difference between the first light and the second light, and adjusting the brightness of a backlight supplied to the liquid crystal molecules according to the brightness of the ambient light.

BRIEF DESCRIPTION OF THE DRAWINGS

The above and other features and aspects of the present invention will become more apparent by describing in detail exemplary embodiments thereof with reference to the attached drawings in which.

DETAILED DESCRIPTION OF THE DRAWINGS

Figure 1:
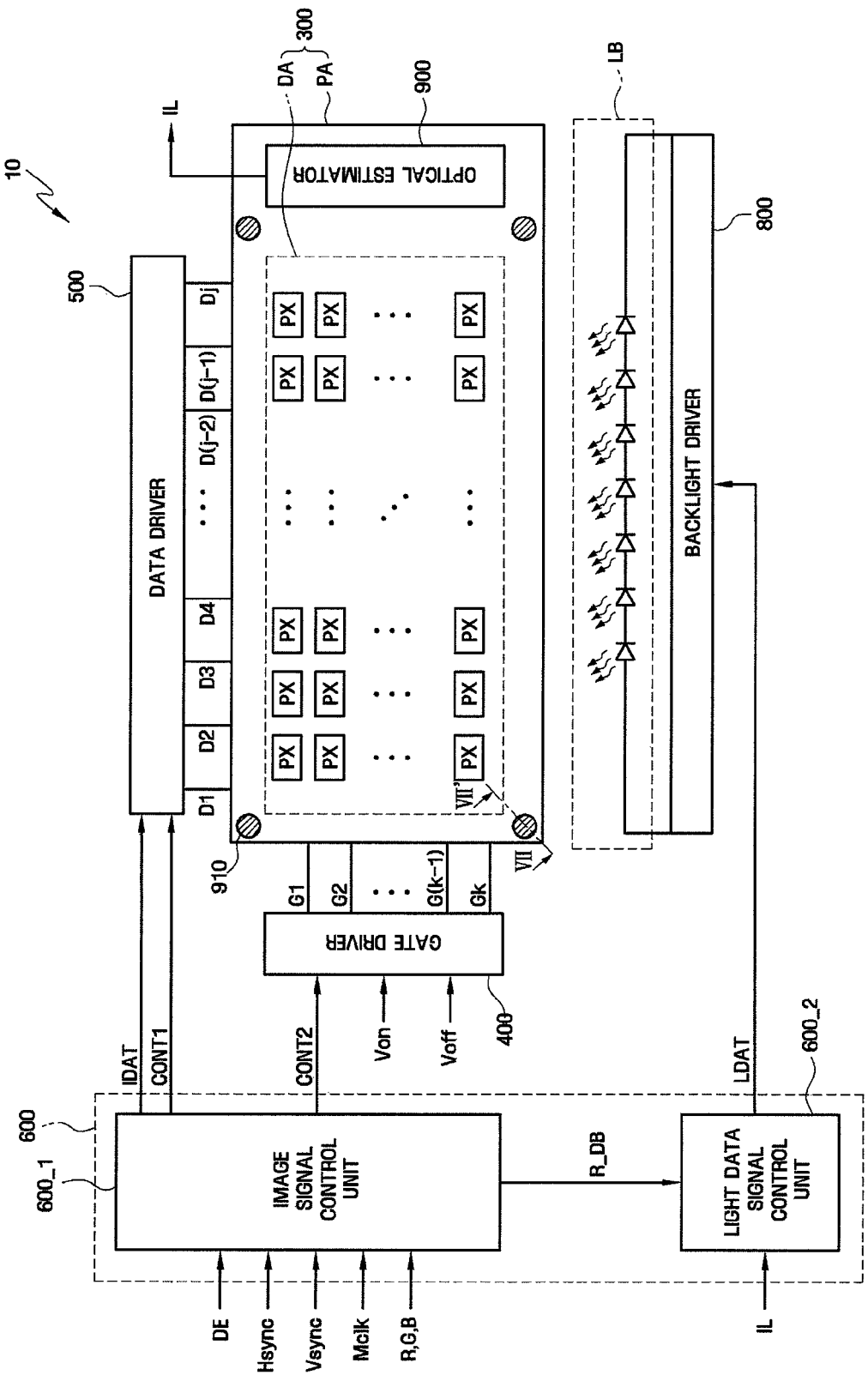
FIG. 1 is a block diagram for explaining a liquid crystal display according to an exemplary embodiment of the present invention, an ambient light estimating method thereof and a driving method of the liquid crystal display.

Aspects and features of exemplary embodiments of the present invention and methods of accomplishing the same may be understood more readily by reference to the following detailed description and the accompanying drawings. The present invention may, however, be embodied in many different forms and should not be construed as being limited to the embodiments set forth herein. Like reference numerals may refer to like elements throughout the specification.

It will be understood that when an element or layer is referred to as being "on," "connected to" or "coupled to" another element or layer, it can be directly on, connected or coupled to the other element or layer or intervening elements or layers may be present.

Figure 2:
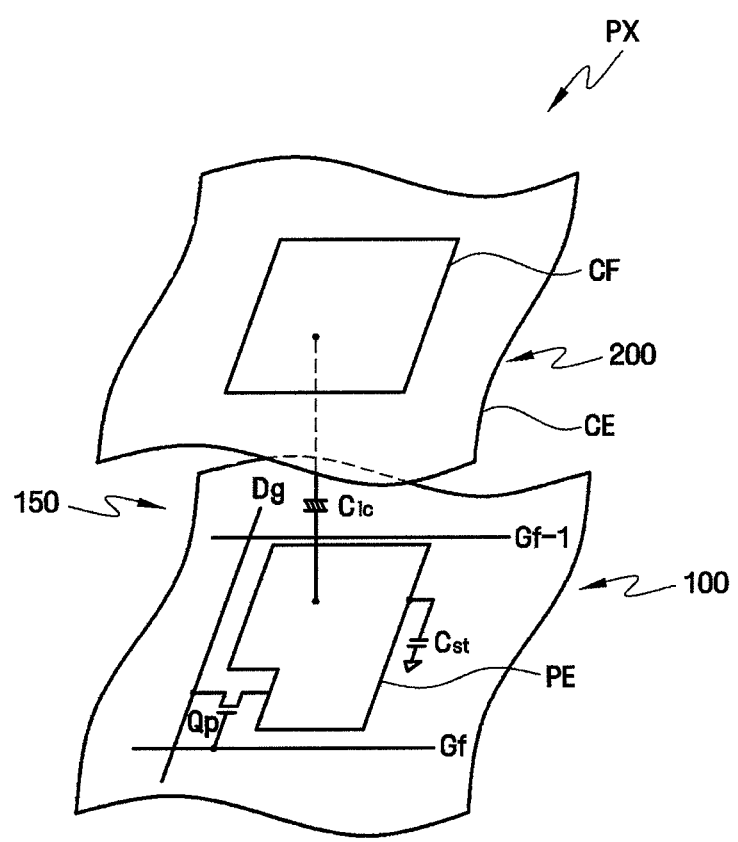
FIG. 2 is an equivalent circuit diagram of a pixel (PX) of a liquid crystal panel shown in FIG. 1.

A liquid crystal display according to an exemplary embodiment of the present invention, an ambient light estimating method thereof and a driving method of the liquid crystal display will be described with reference to FIGS. 1 through 11. FIG. 1 is a block diagram for explaining a liquid crystal display (10) according to an exemplary embodiment of the present invention, an ambient light estimating method thereof and a driving method of the liquid crystal display. FIG. 2 is an equivalent circuit diagram of a pixel (PX) of a liquid crystal panel shown in FIG. 1.

Referring to FIG. 1, the liquid crystal display 10 according to an exemplary embodiment of the present invention includes an liquid crystal panel 300 having a display area (DA) for displaying an image and a peripheral area (PA) where a light measuring unit composed of an optical estimator 900 and a photodetector 910, is mounted. Also mounted on the PA is a signal controller 600 having an image signal control unit 600_1 and a light data signal control unit 600_2, a gate driver 400, a data driver 500, a backlight driver 800, and a light-emitting block LB connected to the backlight driver 800. Here, the backlight driver 800, the light-emitting block LB, a reflecting sheet (810 of FIG. 7), a backlight shielding film (820 of FIG. 7), and a light guide plate (830 of FIG. 7) constitute a backlight unit (800, LB, 810, 820, 830). For brevity, the reflecting sheet, the backlight shielding film and the light guide plate are not shown in FIG. 1. Alternatively, the data driver 500, the signal controller 600, and the backlight driver 800 may be mounted on the liquid crystal panel 300 as an integrated circuit chip.

The liquid crystal panel 300 includes a plurality of gate lines G1-Gk, a plurality of data lines D1-Dj, and a plurality of pixels PX, and is supplied with backlight to display images. The respective pixels PX are defined at intersections of the gate lines G1-Gk and the data lines D1-Dj. Although not shown, the plurality of pixels PX can be divided into red sub-pixels, green sub-pixels, and blue sub-pixels.

An equivalent circuit of each pixel PX is described with reference to FIG. 2. For example, a pixel PX connected to an f-th gate line Gf (where f is 1 through k) and a g-th data line Dg (where g is from 1 through j) includes a switching element Qp connected to the gate line Gf and the data line Dg, a liquid crystal capacitor Clc, and a storage capacitor Cst connected thereto. The liquid crystal capacitor $C_{lc}$ includes two electrodes, for example, a pixel electrode PE of a first display panel 100, a common electrode CE of a second display panel 200, liquid crystal molecules 150 interposed between the first and second display panels 100 and 200. A color filter CF is formed at a portion of the common electrode CE.

Molecular orientations of the liquid crystal molecules 150 may vary according to the electric field generated by the electrodes. Orientations of liquid crystal molecules 150 may vary according to the electric field generated by the pixel electrode PE of the first display panel 100 and the common electrode CE of the second display panel 200, for example, as shown in FIG. 1, thereby displaying desired images. The liquid crystal capacitor Clc and the storage capacitor Cst facilitate the generation and maintenance of the electric field between the electrodes, and thus establish and maintain the molecular orientations of the liquid crystal molecules 150.

Referring back to FIG. 1, the liquid crystal panel 300 includes a display area DA displaying an image and a peripheral area PA, which may be, for example, a non-display area. The display area DA includes a plurality of pixels PX each displaying an image in response to an image data voltage supplied from the data driver 500.

The first display panel (100 of FIG. 2) is wider than the second display panel (200 of FIG. 2) in the peripheral area PA and an image is not displayed on the peripheral area PA.

The light measuring unit, comprising the optical estimator 900 and the photodetector 910, may be mounted in the peripheral area PA. The light measuring unit (900 and 910) may obtain an illuminance level IL of a backlight depending on the brightness of ambient light and supplies the obtained illuminance level IL to the signal controller 600. The light measuring unit (900 and 910) is described in detail below with reference to FIG. 11.

The signal controller 600 is supplied with first image signals R, G, and B, external control signals Vsync, Hsync, Mclk, and DE controlling the display thereof, and the illuminance level IL of the backlight, and generates second image signals IDAT, data control signals CONT1, gate control signals CONT2, and light data signals LDAT.

In detail, the signal controller 600 converts the first image signals R, G, and B into the second image signals IDAT and generates the same. In addition, the signal controller 600 may be supplied with the light data signals LDAT compensated according to the backlight illuminance level IL and may then transmit the compensated light data signals to the backlight driver 800.

The signal controller 600 may be functionally divided into the image signal control unit 600_1 and the light data signal control unit 600_2. The image signal control unit 600_1 controls the image displayed on the liquid crystal panel 300, while the light data signal control unit 600_2 controls the operation of the backlight driver 800. The image signal control unit 600_1 and the light data signal control unit 600_2 may be physically separated from each other.

In detail, the image signal control unit 600_1 receives a first image signal R, B and outputs a second image signal IDAT corresponding to the received first image signal R, G, B. The image signal control unit 600_1 may also receive external control signals Vsync, Hsync, Mclk, and DE, and generate a data control signal CONT1 and a gate control signal CONT2. Examples of the external control signals Vsync, Hsync, Mclk, and DE include a vertical synchronization signal Vsync, a horizontal synchronization signal Hsync, a main clock signal MCLK, and a data enable signal DE. The data control signal CONT1 is used to control the operation of the data driver 500, and the gate control signal CONT2 is used to control the operation of the gate driver 400.

In addition, the image signal control unit 600_1 may receive the first R, G, and B image signal R, G, B, output a representative image signal R_DB, and supply the same to the light data signal control unit 600_2. The image signal control unit 600_1 is described below in more detail with reference to FIG. 3.

The light data signal control unit 600_2 may receive the representative image signal R_DB and the back light illuminance level IL and supply a light data signal LDAT to the backlight driver 800. The light data signal control unit 600_2 will be described below in more detail with reference to FIG. 5.

The gate driver 400, provided with the gate control signal CONT2 from the image signal control unit 600_1, applies a gate signal to the gate lines G1-Gk. Here, the gate signal is composed of a combination of a gate-on voltage Von and a gate-off voltage Voff, which are generated from a gate on/off voltage generator (not shown). The gate control signal CONT2 for controlling the operation of the gate driver 400 includes a vertical synchronization start signal for instructing a start of the operation of the gate driver 400, a gate clock signal controlling an output timing of the gate on signal, an output enable signal that determines a pulse width of the gate-on voltage Von, etc. Although not shown, the gate driver 400 may be implemented as a plurality of gate driver chips.

The data driver 500 receives the data control signal CONT1 from the image signal control unit 600_1 and applies a voltage corresponding to the second image signal IDAT to the data lines D1-Dj. The voltage corresponding to the second image signal IDAT may be a voltage supplied from a gray voltage generator (not shown) according to grayscales of the second image signal IDAT. Accordingly, the voltage may be obtained by dividing a driving voltage of the gray voltage generator by the grayscales of the second image signal IDAT. The data control signal CONT1 includes signals for controlling the operation of the data driver 500. The signals for controlling the operation of the data driver 500 include a horizontal synchronization start signal for starting the operation of the data driver 500, an output enable signal that determines the output of an image data voltage, etc.

Although not shown, the data driver 500 may be implemented as a plurality of data driver chips.

The backlight driver 800 adjusts the amount of a backlight supplied from a light-emitting block LB in response to the light data signal LDAT. The brightness of the light-emitting block LB may vary according to a pulse width or duty ratio of the light data signal LDAT. The internal structure and operation of the backlight driver 800 is described in more detail below with reference to FIG. 6.

The light-emitting block LB, including at least one light source, may supply the liquid crystal panel 300 with light. As shown, the light-emitting block LB may comprise a point light source such as a light emitting diode (LED), for example. Alternatively, the light-emitting block LB may comprise a point light source or a linear light source. The brightness of the light-emitting block LB can be controlled by the backlight driver 800 connected to the light-emitting block LB.

Figure 3:
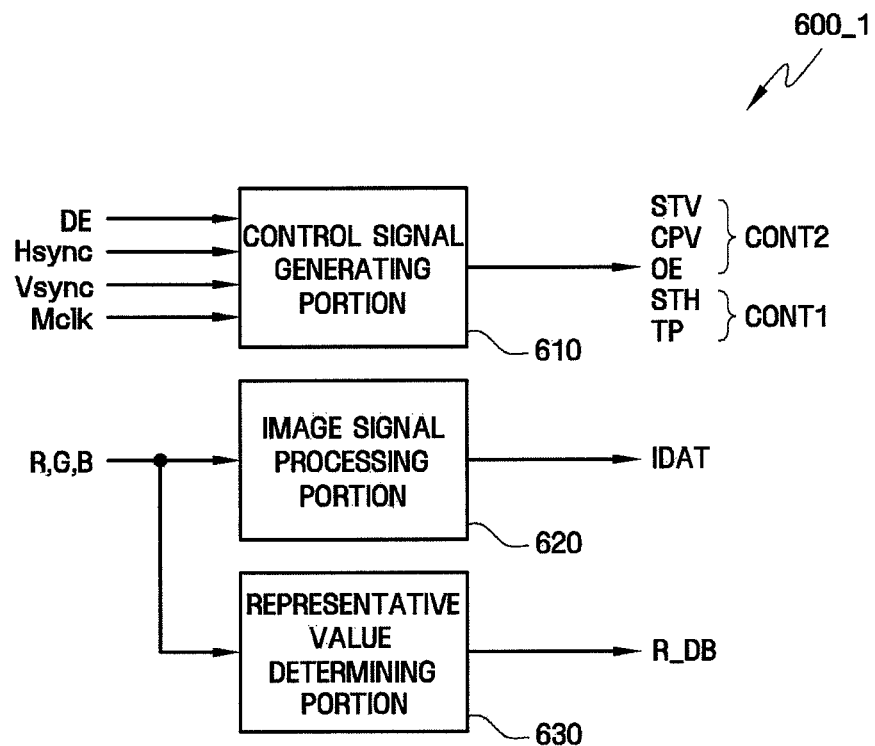
FIG. 3 is a block diagram of an image signal controller shown in FIG. 1.
Figure 4:
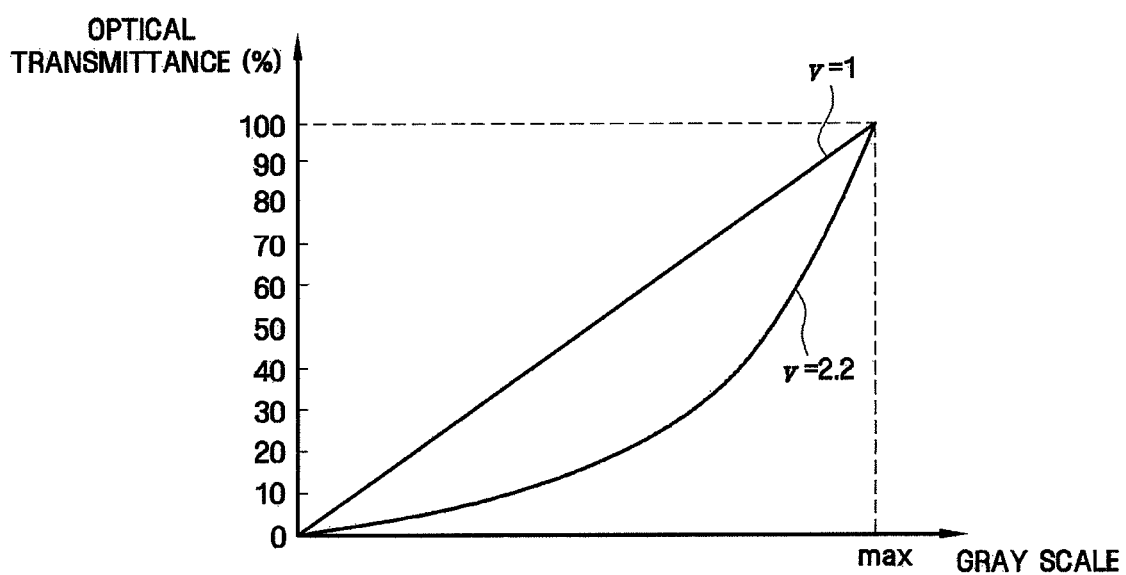
FIG. 4 is a graph for explaining gamma conversion performed by the image signal controller shown in FIG. 3.

FIG. 3 is a block diagram of an image signal controller shown in FIG. 1 and FIG. 4 is a graph explaining gamma conversion performed by the image signal controller shown in FIG. 3.

Referring to FIG. 3, the image signal controller 600_1 includes a control signal generating portion 610, an image signal processing portion 620, and a representative value determining portion 630.

The control signal generating portion 610 receives the external control signals Vsync, Hsync, Mclk, and DE and outputs the data control signal CONT 1 and the gate control signal CONT2. In detail, the control signal generating portion 610 may generate various signals, such as a vertical start signal STV for starting the operation of the gate driver 400 shown in FIG. 2, a gate clock CPV for determining an output time of the gate-on voltage Von, a gate output enable signal OE for determining a pulse width of the gate-on voltage Von, a horizontal synchronization start signal STH for starting the operation of the data driver 500 shown in FIG. 1, and an output instruction signal TP for instructing the output of an image data voltage.

The image signal processing portion 620 may receive first image signals R, G and B, convert the same and output second image signals IDAT. The second image signals IDAT may be signals gamma-converted from the first image signals R, G and B and may provide for a more accurate display image.

Referring to FIG. 3, the first image signals R, G and B may have first gray scales and the second image signals IDAT may have second gray scales. The image signal processing portion 620 may convert the first image signals R, G and B into second image signals R', G', and B' using a look-up table (not shown) in which the second gray scales corresponding to the first gray scales are stored.

The image signal processing portion 620 may convert the first image signals R, G and B, having first gray scales into image signals with second gray scales corresponding to a gamma curve having a gamma coefficient γ of 2.2, and output the converted image signals. Referring to FIG. 4, two gamma curves are expressed in a coordinate plane consisting of x- and y-axes respectively representing gray scales and optical transmittance. The linear portion of the gamma curve represents optical transmittance of liquid crystal molecules with respect to each gray scale when the gamma coefficient γ is 1. The curved portion of the gamma curve represents optical transmittance of liquid crystal molecules with respect to each gray scale when the gamma coefficient γ is 2.2. Here, 2.2 is known as an ideal gamma coefficient, and in the x-axis, 0 represents the minimum gray scale, and max represents the maximum gray scale, respectively.

Referring again to FIG. 3, the representative value determining portion 630 determines a representative image signal R_DB displayed on the liquid crystal panel 300. For example, the representative value determining portion 630 may receive the first image signals R, G, and B and determine the representative image signal R_DB. The representative image signal R_DB may be an average value of the first image signals R, G, and B. Thus, the representative image signal R_DB may indicate an average luminance value of the image displayed on the liquid crystal panel 300.

Figure 5:
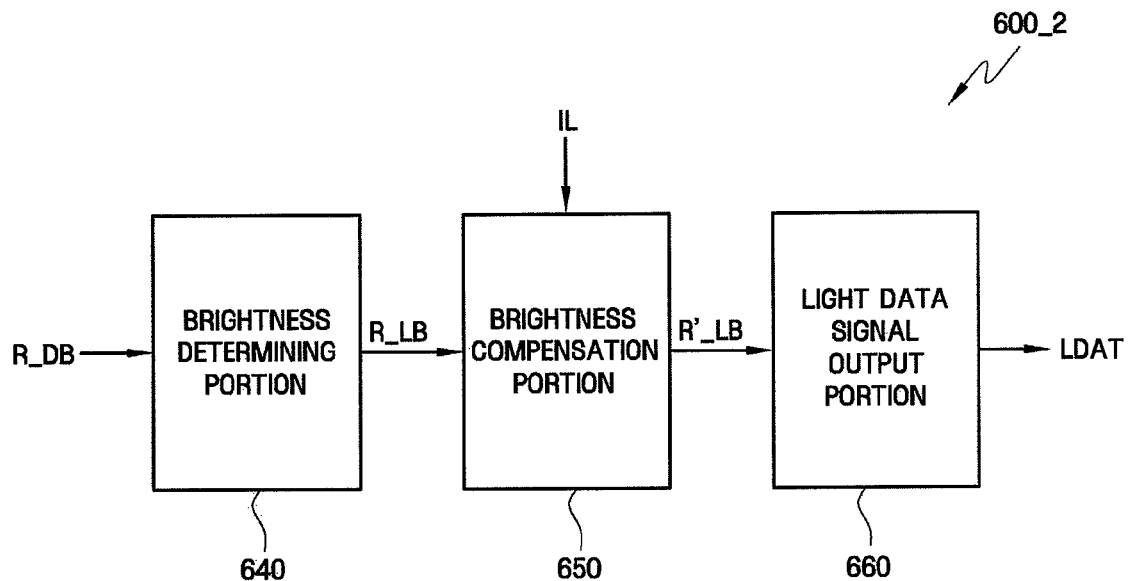
FIG. 5 is a timing diagram for explaining a light data signal shown in FIG. 1.

FIG. 5 is a block diagram of a light data signal controller shown in FIG. 1.

Referring to FIGS. 1 and 5, the light data signal controller 600_2 includes a brightness determining portion 640, a brightness compensation portion 650, and a light data signal output portion 660.

The brightness determining portion 640 receives a representative image signal R_DB to determine a native brightness R_LB of a backlight corresponding to the representative image signal R_DB and outputs the native brightness R_LB of the backlight to the brightness compensation portion 650. For example, the brightness determining portion 640 may determine the native brightness R_LB of the backlight using a look-up table (not shown).

The brightness compensation portion 650 receives the native brightness R_LB of the backlight and the illuminance level IL of the backlight. The brightness compensation portion 650 may supply compensated brightness R'_LB of the backlight, which is corrected based on the illuminance level IL of the backlight to the light data signal output portion 660.

In addition, the brightness compensation portion 650 may supply compensated brightness R'_LB of the backlight, which is corrected based on the brightness of ambient light. In this case, the illuminance level IL of the backlight may be a value obtained by measuring the brightness of ambient light. In detail, if the brightness of ambient light is in a low level, the illuminance level IL of the backlight has a small value, and if the brightness of ambient light is in a high level, the illuminance level IL of the backlight has a large value.

As described above, the native brightness R_LB of the backlight is compensated for based on the illuminance level IL of the backlight, which varies according to the brightness of ambient light, thereby adjusting the illuminance level IL of the backlight according to the brightness of ambient light. That is to say, display quality can be improved and power consumption can be reduced by lowering the brightness of backlight when ambient light is in a low level, and raising the brightness of backlight when ambient light is in a high level.

The light data signal output portion 660 outputs the light data signal LDAT in response to the compensated brightness R'_LB of the backlight, which is supplied from the brightness compensation portion 650. As described above, the light data signal LDAT corresponding to the compensated backlight brightness R'_LB is supplied to the backlight driver 800, thereby adjusting the backlight brightness supplied from the light-emitting block LB. The pulse width of the light data signal LDAT can be adjusted based on the brightness of ambient light.

Figure 6:
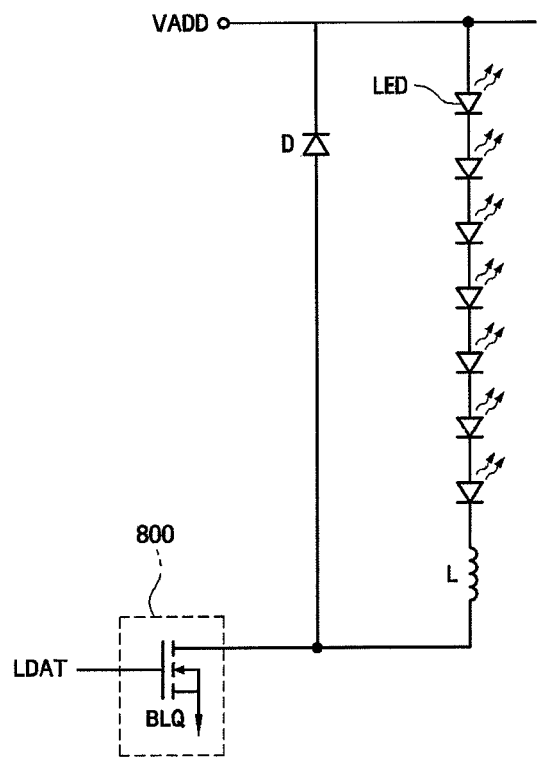
FIG. 6 is a circuit diagram for explaining the operation of a backlight driver and a light-emitting block shown in FIG. 1.

FIG. 6 is a circuit diagram for explaining the operation of a backlight driver and a light-emitting block shown in FIG. 1.

Referring to FIG. 6, the backlight driver 800 includes a switching device BLQ, and controls the brightness of the light-emitting block LB.

The operation of the backlight driver 800 will now be described. When the light data signal LDAT becomes at a high level, the switching device BLQ is turned on and a power supply voltage Vin is supplied to the light-emitting block LB, so that current flows to the inductor L. Here, the energy derived from the current is stored in the inductor L. When the light data signal LDAT becomes at a low level, the switching device BLQ is turned off, forming a closed circuit composed of the light-emitting block LB, the inductor L, and a diode D, so that current flows through the closed circuit. Here, as the energy stored in the inductor L is discharged and the amount of current stored in the inductor L is reduced. Since a time in which the switching device BLQ is turned on is adjusted according to the duty ratio of the light data signal LDAT, the brightness of the light-emitting block LB is controlled by the duty ratio of the light data signal LDAT.

The pulse width of the light data signal LDAT can be adjusted according to the brightness of ambient light. Accordingly, the brightness of the light-emitting block LB can be controlled according to the brightness of ambient light. For example, when the brightness of ambient light is at a high level, the pulse width of the light data signal LDAT may be increased. On the other hand, when the brightness of ambient light is at a low level, the pulse width of the light data signal LDAT may be decreased. As a result, when the brightness of ambient light is at a high level, the brightness of the light-emitting block LB, and as such, the brightness of the backlight, is increased, and when the brightness of ambient light is at a low level, the brightness of the light-emitting block LB, and as such, the brightness of the backlight, is decreased.

Figure 7:
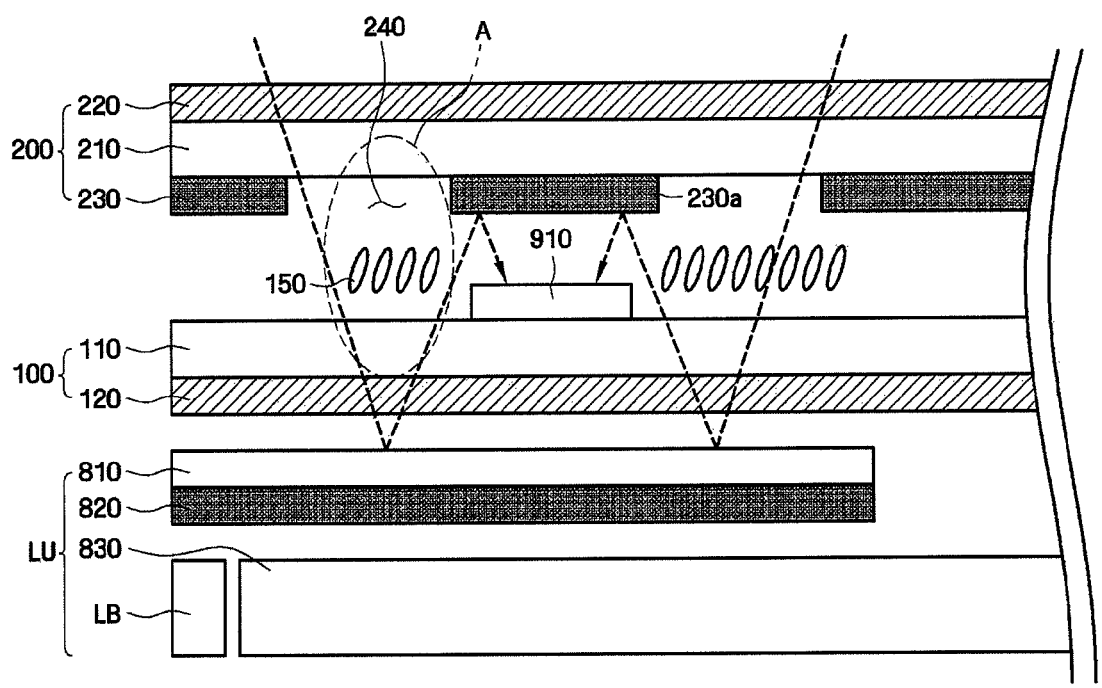
FIG. 7 is a cross-sectional view taken along the line VII-VII' for showing a non-display area shown in FIG. 1 in a liquid crystal display according to an exemplary embodiment of the present invention.
Figure 8:
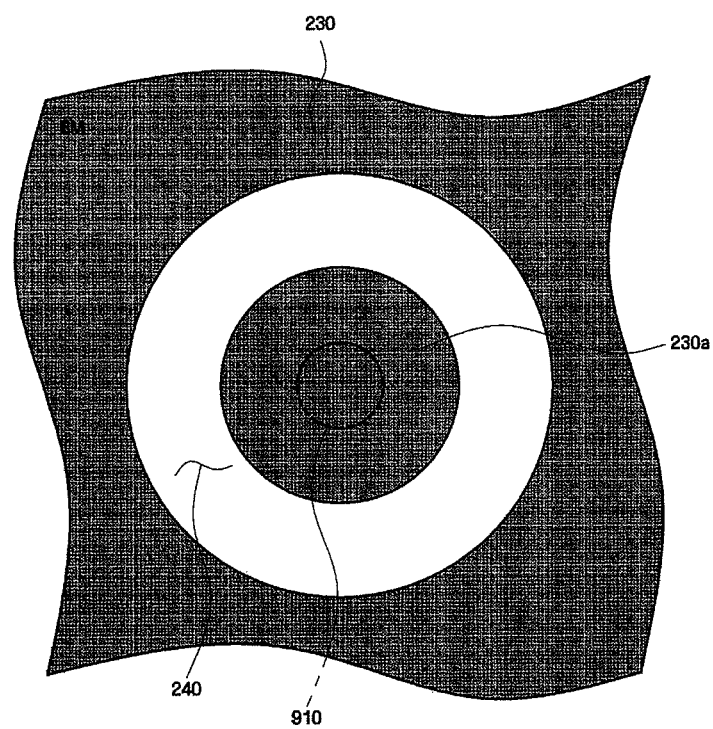
FIG. 8 is a top view of an ambient light shielding film shown in FIG. 7.

FIG. 7 is a cross-sectional view taken along the line VII-VII' for showing a non-display area shown in FIG. 1 in a liquid crystal display according to an exemplary embodiment of the present invention, and FIG. 8 is a top view of an ambient light shielding film shown in FIG. 7.

Referring to FIGS. 7 and 8, the first display panel 100 may include a first substrate 110 and a first polarizer 120. The second display panel 200 may include a second substrate 210, a second polarizer 220, and an ambient light shielding film 230. The light-emitting unit LU, for example, the backlight unit, may include a light-emitting block LB, a reflecting sheet 810, a backlight shielding film 820, a light guide plate 830, and a backlight driver (800 of FIG. 1). For brevity, a backlight driver is not shown in FIG. 8. Meanwhile, the photodetector 910 may be mounted in the first display panel 100.

Figure 9:
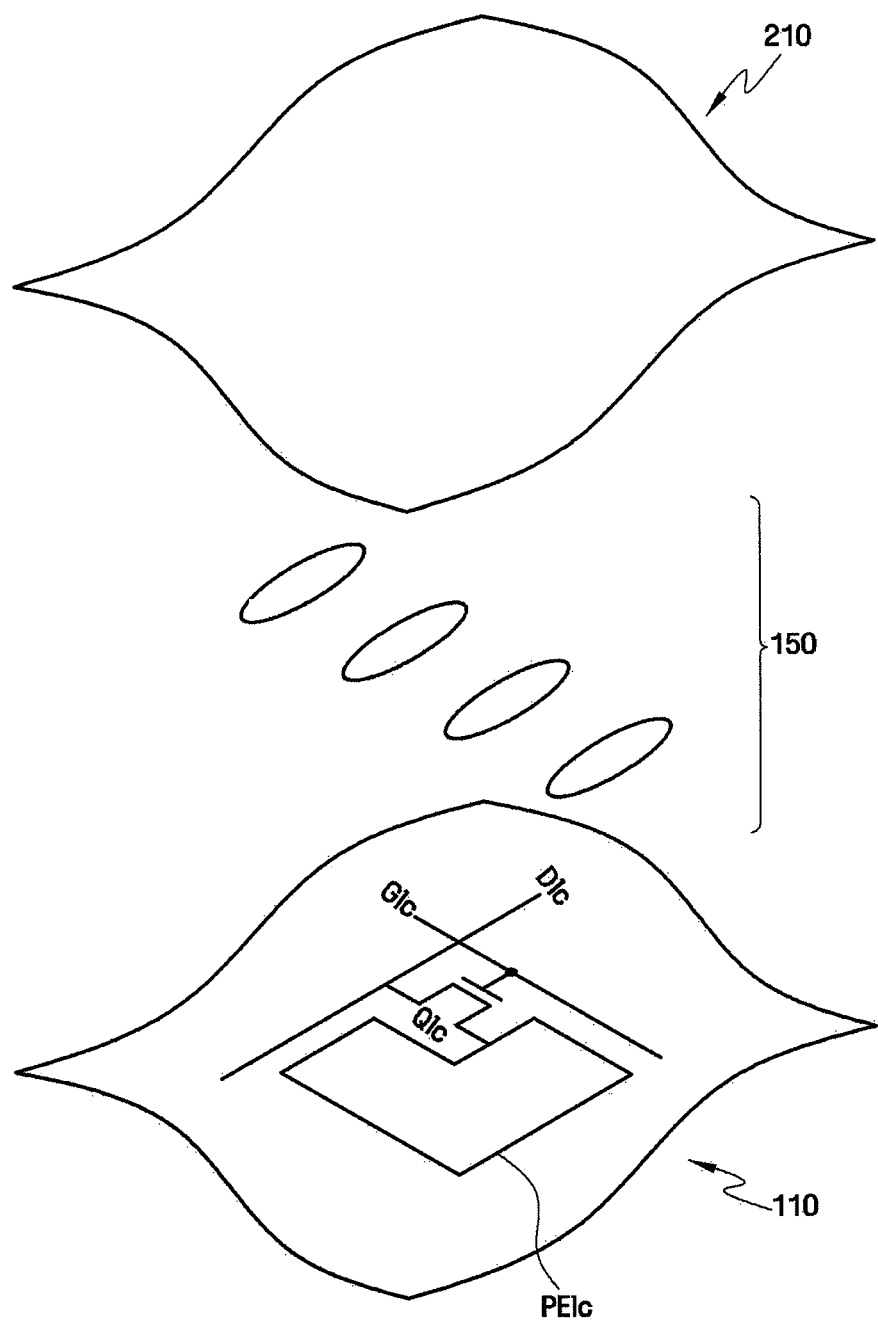
FIG. 9 is a circuit diagram for explaining the operation of a portion "A" shown in FIG. 7.

The first substrate 110 may include thin film transistors (Qlc of FIG. 9) and a pixel electrode PElc of FIG. 9. The second substrate 210 may include a common electrode (not shown). The ambient light is incident into the liquid crystal molecules 150 interposed between the first display panel 100 and the second display panel (200 of FIG. 2) in the peripheral area PA, and the orientation of the liquid crystal molecules 150 is changed by an electric field. The electric field changing the orientation of the liquid crystal molecules 150 may be adjusted by a voltage, for example, V_Pelc of FIG. 10, applied to the pixel electrode of the first substrate 110.

The first polarizer 120 is disposed below the liquid crystal molecules 150, and the reflecting sheet 810 is disposed below the first polarizer 120. The first polarizer 120 may have a transmission axis perpendicular to that of the second polarizer 220. The reflecting sheet 810 reflects ambient light incident thereto toward the liquid crystal molecules 150.

The light guide plate 830 makes backlight incident from the light-emitting block LB redirect to the liquid crystal panel (300 of FIG. 1). The backlight shielding film 820 prevents the backlight from being incident to the liquid crystal panel 300. The backlight shielding film 820 may be a black backlight unit tape, for example. The backlight unit tape may attach the light-emitting unit LU to the liquid crystal panel 300 by attaching the light guide plate 830 and the reflecting sheet 810 to each other. Alternatively, the backlight shielding film 820 and the reflecting sheet 810 may be integrally formed. Further, the backlight shielding film 820 and the reflecting sheet 810 may have the same size.

The ambient light shielding film 230 is disposed above the liquid crystal molecules 150 and the second polarizer 220 is disposed above the ambient light shielding film 230.

The ambient light shielding film 230 prevents ambient light from being directly incident into the photodetector 910. The ambient light shielding film 230 may be, for example, a black matrix BM. The ambient light shielding film 230 may have a light path hole 240. The ambient light may be incident into the reflecting sheet 810 through the light path hole 240.

As shown in FIG. 8, the ambient light shielding film 230 may include a light-shielding island 230a disposed corresponding to a position of the photodetector 910. Thus, the light-shielding island 230a can prevent the ambient light from being directly incident into the photodetector 910.

Here, unlike in FIG. 8, the light path hole 240 may be foamed to match a periphery of the photodetector 910 of the ambient light shielding film 230. Accordingly, the ambient light shielding film 230 includes an opening formed therein. Further, the light path hole 240 may have an annular shaped, as shown in FIG. 8.

The photodetector 910 is capable of sensing the ambient light that has passed through the liquid crystal molecules 150. For example, the photodetector 910 may sense the ambient light that has passed through the liquid crystal molecules 150 after entering through the light path hole 240 on its way to the reflecting sheet 810 and then the ambient light may pass though the liquid crystal molecules 150 for a second time after reflecting off of the reflecting sheet 810 on its way to the photodetector 910. Along the way, the ambient light may reflect off of the bottom of the light-shielding island 230a and into the photodetector 910 after having been reflected by the reflecting sheet 810.

The path of ambient light passing through before reaching the photodetector 910 will now be described briefly. The ambient light is incident from the upper side of the second polarizer 220, and sequentially passes through the second polarizer 220, the liquid crystal molecules 150, and the first polarizer 120, to then be reflected at the reflecting sheet 810.

Finally, the ambient light passes through the first polarizer 120 until it reaches the photodetector 910.

In a case where the ambient light shielding film 230 is capable of reflecting light, for example, if the ambient light shielding film 230 is a material containing chromium (Cr), for example, a black matrix BM, the ambient light is reflected at the reflecting sheet 810, and passes through the first polarizer 120 to then reflected back to the ambient light shielding film 230, and finally reaches the photodetector 910.

A loss of ambient light resulting from its passing through the second polarizer 220 once and passing through the first polarizer 120 twice is roughly estimated at 50%. An amount of the ambient light having passed through the transmission axis of the second polarizer 220 is approximately 50%. Since the transmission axes of the first polarizer 120 and the second polarizer 220 are perpendicular to each other, the polarization of the ambient light will remain even after passing through the second polarizer 220. Accordingly, the loss of ambient light produced while passing through the first polarizer 120 twice is negligible. As a result, the loss of ambient light produced before it reaches the photodetector 910 is roughly estimated at 50%.

Figure 10:
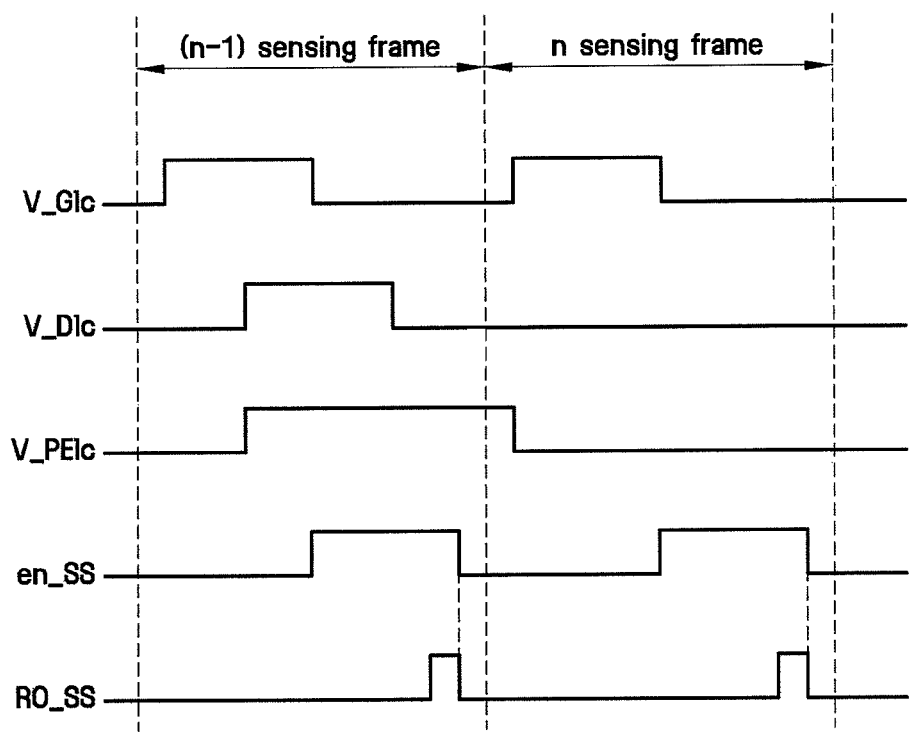
FIG. 10 is a timing diagram illustrating signals for driving the circuit shown in FIG. 9.

FIG. 9 is a circuit diagram for explaining the operation of a portion "A" shown in FIG. 7. FIG. 10 is a timing diagram illustrating signals for driving the circuit shown in FIG. 9.

Referring to FIGS. 9 and 10, the pixel electrode PElc, which adjusts the orientation of the liquid crystal molecules 150 for passing through ambient light, is switched by a gate voltage V_Glc applied through a gate line Glc, and a data voltage Dlc is applied thereto through a data line Dlc. As the data voltage Dlc is applied to the pixel electrode PElc, the magnitude of the voltage of the pixel electrode PElc is changed, thereby adjusting the orientation of the liquid crystal molecules 150.

Referring to FIG. 10, liquid crystal molecules are oriented to be at a first orientation state, and ambient light is allowed to pass through the liquid crystal molecules, and first light having passed through the liquid crystal molecules is sensed. In addition, liquid crystal molecules are oriented to be at a second orientation state, and ambient light is allowed to pass through the liquid crystal molecules, and second light having passed through the liquid crystal molecules is sensed.

Here, the first orientation state of the liquid crystal molecules, referred to as an orientation state of the liquid crystal molecules, is for displaying black on the liquid crystal panel and the second orientation state of the liquid crystal molecules, referred to as a orientation state of the liquid crystal molecules, is for displaying white on the liquid crystal panel. However, this description is provided only for illustration and the orientation states of the liquid crystal molecules may vary according to the use or purpose of a liquid crystal display.

In detail, if the voltage V_PElc applied to the pixel electrode PElc is a first level, the liquid crystal molecules 150 are oriented to the first orientation state and if the voltage V_PElc applied to the pixel electrode PElc is a second level, the liquid crystal molecules 150 are oriented to the second orientation state. Referring to FIG. 10, a frame in which the voltage V_PElc applied to the pixel electrode PElc is kept high is longer than a frame in which the data voltage Dlc is kept high, which is due to a liquid crystal capacitor, and a storage capacitor, as shown in FIG. 2.

A sensor enable signal en_SS used to enable the photodetector (910 of FIG. 1) by the liquid crystal molecules 150 is activated to a high level while the liquid crystal molecules 150 are kept at the first orientation state and the second orientation state. A read-out enable signal RO_SS, used to enable a read-out circuit (920 of FIG. 11) of the optical estimator (900 of FIG. 1), is activated to a high level in a predetermined time after the photodetector 910 is enabled. The ambient light, having passed through the liquid crystal molecules 150 in the first orientation state (the first light) can be sensed in the (n−1) sensing frame. In addition, the ambient light having passed through the liquid crystal molecules 150 in the second orientation state (the second light) can be sensed in the (n) sensing frame. For the same photodetector 910, the first light and the second light can be measured in a time-divisional manner. Further, the optical estimator (900 of FIG. 1) can estimate the brightness of ambient light using a difference between the first light and the second light, which is described in detail below.

Figure 11:
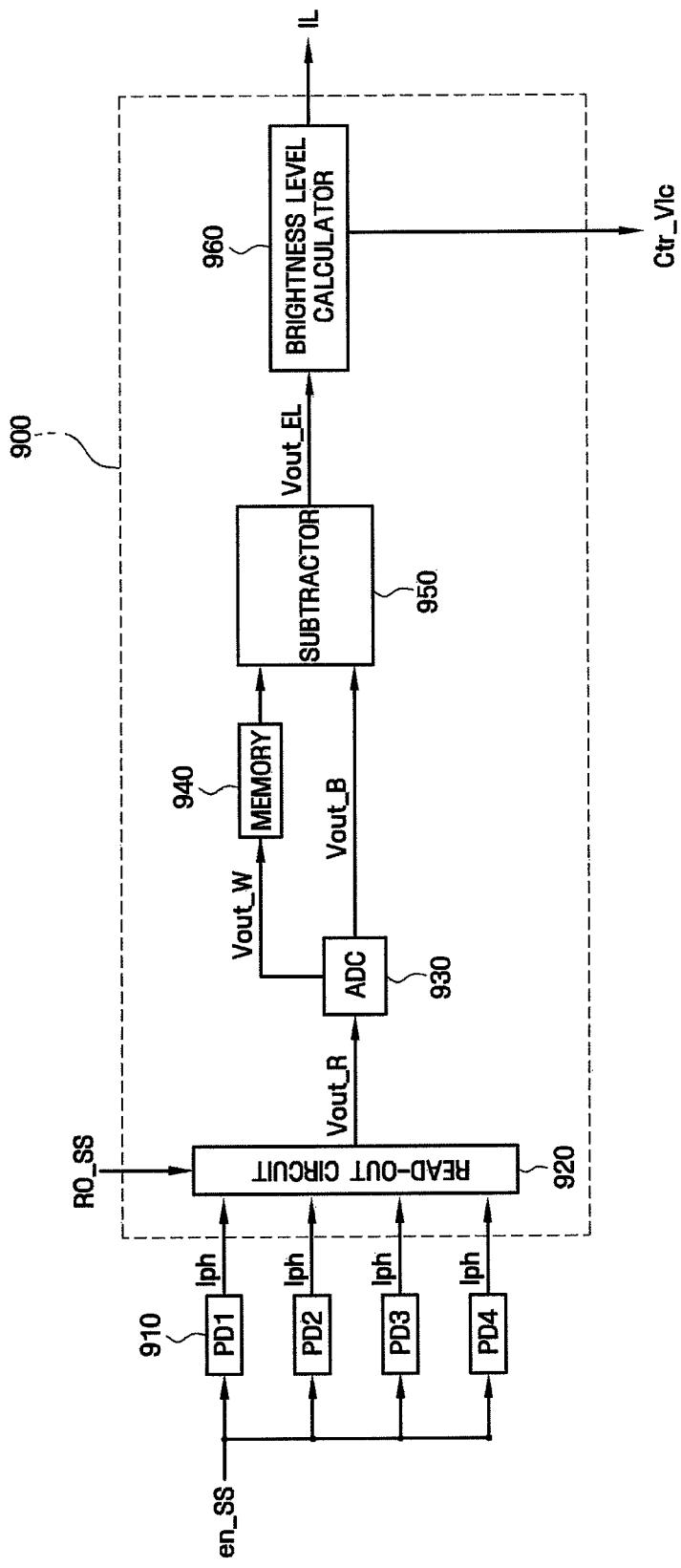
FIG. 11 is a block diagram of a light measuring unit shown in FIG. 1.

FIG. 11 is a block diagram of a light measuring unit shown in FIG. 1.

Referring to FIG. 11, the light measuring unit includes the photodetector 910 and the optical estimator 900.

The photodetector 910 is enabled by the sensor enable signal en_SS and outputs photo current Iph. As described above with reference to FIGS. 9 and 10, the photodetector 910 is capable of detecting first light and second light in a time-divisional manner. Meanwhile, PD1, PD2, PD3, and PD4 shown in FIG. 11 are four photodetectors 910 disposed at four edges of the liquid crystal panel 300 shown in FIG. 1. Since the ambient light is sensed using the four photodetectors 910 disposed at four edges of the liquid crystal panel 300 and the brightness of the ambient light is measured using the photo current Iph output from the four photodetectors 910, the measured brightness of the ambient light becomes less sensitive to a local change in the ambient light.

The photodetectors 900 can measure the brightness of ambient light using a difference between the first light and the second light. Here, the first light is light detected by the photodetectors 910 when the liquid crystal molecules 150 are oriented to be at a first orientation state and the second light is light detected by the photodetectors 910 when the liquid crystal molecules 150 are oriented to be at a second orientation state.

The optical estimator 900 may include the read-out circuit 920, an analog-to-digital converter (ADC) 930, a memory 940, a subtractor 950, and a brightness level calculator 960.

The read-out circuit 920, which is enabled by the read-out enable signal RO_SS, receives photo current Iph from each of the photodetectors 910 and outputs a voltage output V_out_R that is converted from the input photo current Iph. For example, the read-out circuit 920 converts four values of the photo current Iph into voltage values and obtains an average of the four values to then output the voltage output V_out_R.

The ADC 930 may convert the voltage V_out_R output from the read-out circuit 920 into a digital value. As shown in FIG. 11, the digital values Vout_W and Vout_B are converted when the photodetectors 910 detect the first light and the second light, respectively. The digital value Vout_W corresponding to the first light is stored in the memory 940.

The subtractor 950 performs subtraction to output a difference Vout_EL between the digital value Vout_B corresponding to the second light and the digital value Vout_W corresponding to the first light read from the memory 940.

The brightness level calculator 960 can obtain the brightness of ambient light using the difference Vout_EL between the digital value Vout_B corresponding to the second light and the digital value Vout_W corresponding to the first light, and obtain an illuminance level IL of the backlight, corresponding to the obtained brightness of ambient light.

Meanwhile, if the brightness of the first light exceeds a sensing range of the photodetector 910 or the optical estimator 900, the light measuring unit (900 and 910) changes the first orientation state of the liquid crystal molecules 150, thereby adjusting the brightness of the first light, that is, the amount of the first light. For example, if the photo current Iph corresponding to the first light, which is output from the photodetector 910, exceeds the operating range of the ADC 930, the amount of the first light may be adjusted. Here, in order to orient the liquid crystal molecules 150 in the first orientation state without having to change the operating point of the photodetector 910, a voltage applied to the liquid crystal molecules 150 is changed, thereby adjusting the amount of the first light.

The amount of the first light can be adjusted by changing the voltage applied to the liquid crystal molecules 150 because the amount of the first light can be accurately estimated based on the relationship between the voltage applied to the liquid crystal molecules 150 and optical transmittance of the liquid crystal molecules 150.

Hereinafter, the adjusting of the first light amount will be described by way of example with respect to a case where the first light is sensed for a gamma coefficient γ of 2.2 applied to the second image signals R', G', and B', as described in FIG. 4, and the liquid crystal molecules 150 are fully turned on.

The gamma curve shown in FIG. 4 represents gray scales for various pixels and optical transmittance of liquid crystal molecules 150 with respect to the gray scales when the gamma coefficient γ is 2.2. If the first light is sensed in a state where the liquid crystal molecules 150 are fully turned on, the amount of the sensed first light may correspond to the amount of white light. Accordingly, the amount of the first light corresponding to the voltage applied to the liquid crystal molecules 150 required to fully turn on the liquid crystal molecules 150 can be accurately estimated using the gamma curve.

In summary, the ambient light may be incident from an upper side of the liquid crystal molecules 150. The light-emitting block LB supplies a backlight from a lower side of the liquid crystal molecules 150. The first light having passed through the liquid crystal molecules 150 is sensed in a state in which the liquid crystal molecules 150 are turned on and the second light having passed through the liquid crystal molecules 150 is sensed in a state in which the liquid crystal molecules 150 are turned off. The brightness of ambient light is estimated using a difference between the first light and the second light and the backlight driver can adjust the brightness of the backlight according to the brightness of the ambient light. For example, when the brightness of ambient light is at a high level, the brightness of the backlight is increased and when the brightness of ambient light is at a low lever, the brightness of the backlight is decreased. In such a manner, the brightness of the backlight is adjusted according to the brightness of ambient light, thereby providing for a high display quality of the liquid crystal display 10 according to an exemplary embodiment of the present invention.

Hereinafter, a liquid crystal display according to an exemplary embodiment of the present invention, a method of estimating ambient light, and a driving method of the liquid crystal display will be described with reference to FIG. 12. For brevity, components each having substantially the same function may be respectively identified by the same reference numerals and their repetitive description will be omitted.

Figure 12:
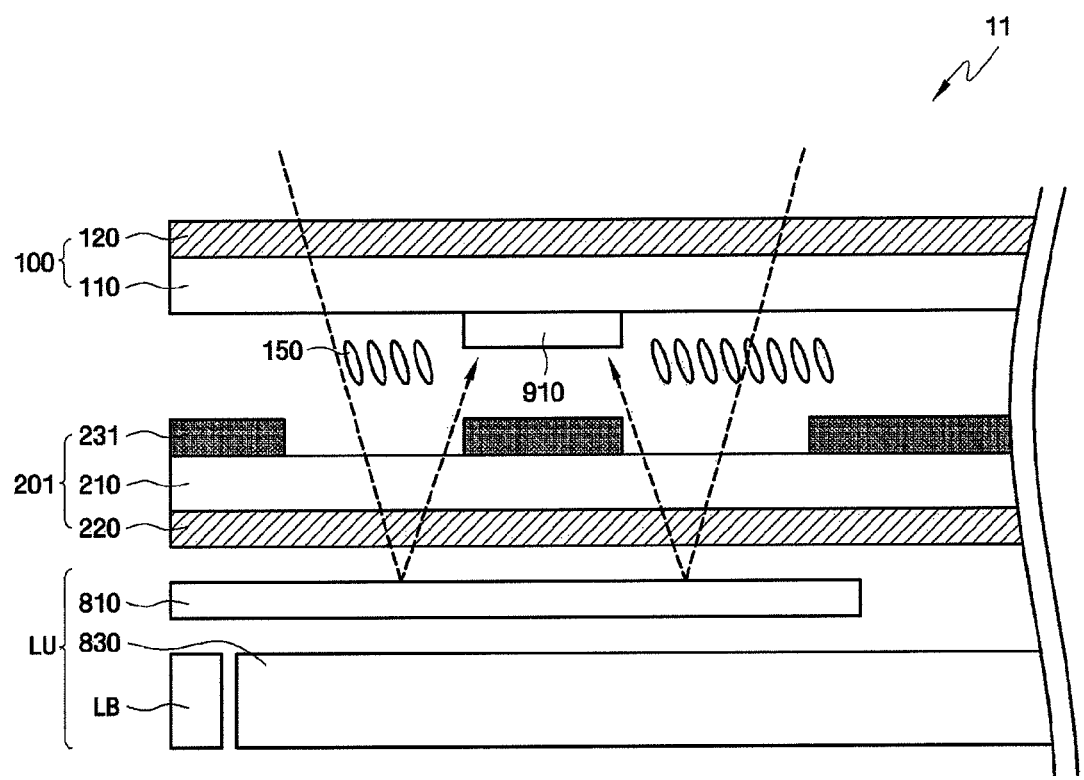
FIG. 12 is a cross-sectional view taken along the line VII-VII' for showing a non-display area shown in FIG. 1 in a liquid crystal display according to an exemplary embodiment of the present invention.

FIG. 12 is a cross-sectional view taken along the line VII-VII' for showing a non-display area shown in FIG. 1 in a liquid crystal display (12) according to an exemplary embodiment of the present invention.

Referring to FIG. 12, a first display panel 100 includes a first substrate 110 and a first polarizer 120. A second display panel 201 includes a second substrate 210, a second polarizer 220, and an ambient light shielding film 231. A light-emitting unit LU, e.g., a backlight unit, includes a light-emitting block LB, a reflecting sheet 810, a light guide plate 830, and a backlight driver (800 of FIG. 1). The first substrate 110 may include thin film transistors (Qlc of FIG. 9) and a pixel electrode PElc of FIG. 9. The second substrate 210 may include a common electrode (not shown).

According to an exemplary embodiment of the present invention, the first display panel 100 is disposed above the liquid crystal molecules 150 and the second display panel 201 is disposed below the liquid crystal molecules 150. The ambient light is incident from an upper side of the first display panel 100. According to an exemplary embodiment of the present invention, an ambient light shielding film 231 is not capable of reflecting light properly. For example, in a case where the ambient light shielding film 231 is a black matrix BM made of an organic material, the ambient light shielding film 231 may not be capable of efficiently reflecting light.

The path of ambient light passing through before reaching the photodetector 910 will now be described briefly. The ambient light is incident from the upper side of the first polarizer 120, and sequentially passes through the first polarizer 120, the liquid crystal molecules 150, and the second polarizer 220, and is then reflected at the reflecting sheet 810. Finally, the ambient light passes through the second polarizer 220 until it reaches the photodetector 910.

According to an exemplary embodiment of the present invention, the ambient light may be incident from the upper side of the liquid crystal molecules 150 and the light-emitting block LB supplies a backlight from the lower side of the liquid crystal molecules 150. The first light having passed through the liquid crystal molecules 150 is sensed in a first orientation state and the second light having passed through the liquid crystal molecules 150 is sensed in a second orientation state. Therefore, like in the exemplary embodiment described above, the brightness of ambient light is estimated using a difference between the first light and the second light first light and the backlight driver can adjust the brightness of the backlight according to the brightness of the ambient light. In such a manner, the brightness of the backlight is adjusted according to the brightness of ambient light, thereby improving the display quality of the liquid crystal display 11 according to an exemplary embodiment of the present invention.

Hereinafter, a liquid crystal display according to an exemplary embodiment of the present invention, an estimating method of ambient light, and a driving method of the liquid crystal display will be described with reference to FIG. 13. For brevity, components each having substantially the same function may be respectively identified by the same reference numerals and their repetitive description will be omitted.

Figure 13:
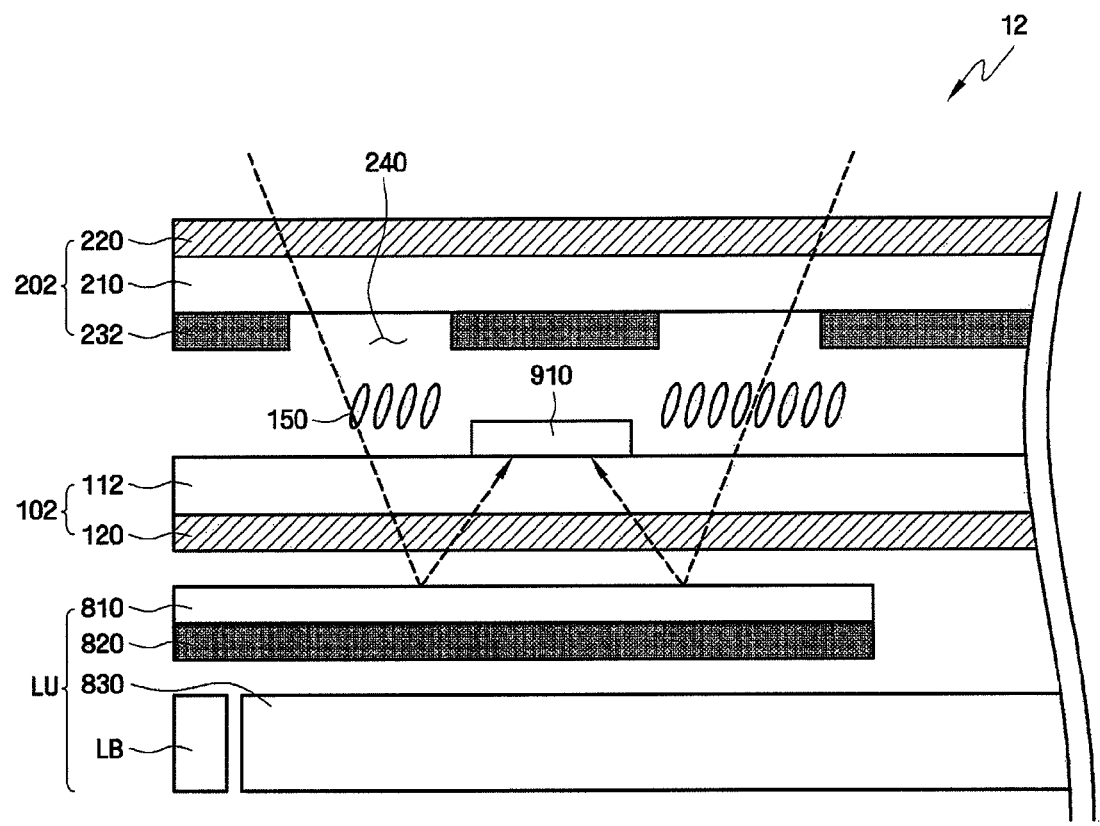
FIG. 13 is a cross-sectional view taken along the line VII-VII' for showing a non-display area shown in FIG. 1 in a liquid crystal display according to an exemplary embodiment of the present invention.

FIG. 13 is a cross-sectional view taken along the line VII-VII' for showing a non-display area shown in FIG. 1 in a liquid crystal display (12) according to an exemplary embodiment of the present invention.

Referring to FIG. 13, a first display panel 102 includes a first substrate 112 and a first polarizer 120. A second display panel 202 includes a second substrate 210, a second polarizer 220, and an ambient light shielding film 232. A light-emitting unit LU, e.g., a backlight unit, includes a light-emitting block LB, a reflecting sheet 810, a light guide plate 830, and a backlight driver (800 of FIG. 1). The first substrate 112 may include thin film transistors (Qlc of FIG. 9) and a pixel electrode PElc of FIG. 9. The second substrate 210 may include a common electrode (not shown).

According to an exemplary embodiment of the present invention, the thin film transistors Qlc of the first substrate 112 may be low temperature poly-Si (LTPS) transistors having a top-gate structure. In the top-gate structure, an active layer is disposed on a source electrode and a drain electrode and a gate electrode is disposed on a gate electrode.

An exemplary embodiment of the present invention may be applied in a case where an ambient light shielding film 233 is not capable of reflecting light properly. For example, in a case where the ambient light shielding film 233 is a black matrix BM made of an organic material, the ambient light shielding film 231 may not be capable of efficiently reflecting light.

The path of ambient light passing through before reaching the photodetector 910 will now be described briefly. The ambient light is incident from the upper side of the second polarizer 220 and sequentially passes through the second polarizer 220, the liquid crystal molecules 150, and the first polarizer 120, to then be reflected at the reflecting sheet 810. Finally, the ambient light passes through the first polarizer 120 until it reaches the photodetector 910.

According to an exemplary embodiment of the present invention, the ambient light may be incident from the lower side of the liquid crystal molecules 150 and the light-emitting block LB supplies a backlight from the lower side of the liquid crystal molecules 150. The first light, having passed through the liquid crystal molecules 150, is sensed in a first orientation state and the second light, having passed through the liquid crystal molecules 150, is sensed in a second orientation state. Therefore, like in the exemplary embodiment described above, the brightness of ambient light is estimated using a difference between the first light and the second light first light and the backlight driver can adjust the brightness of the backlight according to the brightness of the ambient light. In such a manner, the brightness of the backlight is adjusted according to the brightness of ambient light, thereby increasing the display quality of the liquid crystal display 12.

While exemplary embodiments of the present invention have been particularly shown and described with reference to the figures, it will be understood by those of ordinary skill in the art that various changes in form and details may be made therein without departing from the spirit and scope of the present invention.

What is claimed is:

1. A liquid crystal display comprising:
    a first electrode and a second electrode generating an electric field;
    liquid crystal molecules disposed between the first electrode and the second electrode and having an orientation state which is changed as a result of the generated electric field; and
    a photodetector sensing light passing through the liquid crystal molecules,
    wherein ambient light is incident into the liquid crystal molecules, and an ambient light shielding film is further disposed above the liquid crystal molecules for preventing the ambient light from being incident into the liquid crystal molecules, the ambient light shielding film including an opening formed to conform to a periphery of the photodetector,
    the liquid crystal display further comprising:
    a first polarizer disposed below the liquid crystal molecules;
    a reflecting sheet disposed below the first polarizer; and
    a second polarizer disposed above the ambient light shielding film, wherein the ambient light is incident from an upper side of the second polarizer, sequentially passes through the second polarizer, the liquid crystal molecules, and the first polarizer, and is then reflected at the reflecting sheet, and then passes through the first polarizer until it reaches the photodetector.

2. The liquid crystal display of claim 1, wherein the ambient light shielding film is made of an organic material.

3. The liquid crystal display of claim 2, wherein the ambient light shielding film is capable of reflecting light and the ambient light is reflected at the reflecting sheet and passes through the first polarizer to then be reflected back to the ambient light shielding film until it reaches the photodetector.

4. The liquid crystal display of claim 2, wherein the ambient light shielding film is a black matrix made of a material containing chromium (Cr).

5. The liquid crystal display of claim 1, further comprising an optical estimator for estimating the brightness of ambient light using a difference between first light and second light sensed by the photodetector, the first light corresponding to light that passes through a first orientation state of the liquid crystal molecules, and the second light corresponding to light that passes through a second orientation state of the liquid crystal molecules.

6. The liquid crystal display of claim 5, further comprising a liquid crystal panel displaying an image, wherein the first orientation state of the liquid crystal molecules is for displaying black on the liquid crystal panel, and the second orientation state of the liquid crystal molecules is for displaying white on the liquid crystal panel.

7. The liquid crystal display of claim 1, wherein ambient light is incident into the liquid crystal molecules, and an ambient light shielding film is disposed above the liquid crystal molecules for preventing the ambient light from being incident into the liquid crystal molecules, the ambient light shielding film including a light-shielding island disposed corresponding to a position of the photodetector.

8. The liquid crystal display of claim 1, wherein the ambient light shielding film is a black matrix.

9. The liquid crystal display of claim 5, wherein the opening is annular-shaped.

10. The liquid crystal display of claim 5, wherein when the brightness of the first light exceeds a sensing range of the photodetector or the optical estimator, the brightness of the first light is adjusted by changing the first orientation state of the liquid crystal molecules.

11. The liquid crystal display of claim 10, wherein based on a gamma curve representing a gray scale applied to at least one of the first electrode and the second electrode and the optical transmittance of the liquid crystal molecules corresponding to the gray scale, at least one of the first electrode and the second electrode is driven to display the image and the brightness of the first light is adjusted by estimating the amount of the ambient light using the gamma curve.

12. The liquid crystal display of claim 5, wherein the ambient light is incident from an upper side of the liquid crystal molecules and the liquid crystal display further comprises:
    a light-emitting block supplying a backlight from a lower side of the liquid crystal molecules; and
    a backlight driver adjusting the brightness of the backlight according to the brightness of the ambient light.

13. The liquid crystal display of claim 12, wherein when the brightness of the ambient light is at a relatively high level, the brightness of the backlight is increased, and when the brightness of the ambient light is at a relatively low level, the brightness of the backlight is decreased.

14. The liquid crystal display of claim 12, further comprising:
    a backlight driver controlling the brightness of the light-emitting block; and a light data signal control portion supplying a light data signal to the backlight driver, wherein the pulse width of the light data signal is adjusted according to the brightness of the ambient light.

15. The liquid crystal display of claim 5, wherein the first light is sensed in a state where the liquid crystal molecules allow for maximum light transmittance therethrough.

\* \* \* \* \*